United States Patent [19]

Jurgens

[11] Patent Number: 4,739,555

[45] Date of Patent: Apr. 26, 1988

[54] LAMINATED GLASS CUTTER

[76] Inventor: Werner Jurgens, 3 Glenister Street, Archerfield, Brisbane, Queensland, Australia, 4108

[21] Appl. No.: 820,495

[22] Filed: Jan. 17, 1986

[30] Foreign Application Priority Data

Jun. 18, 1985 [AU] Australia .............................. PH1071

[51] Int. Cl.⁴ .............................................. B26D 3/08
[52] U.S. Cl. ................................... 30/164.95; 30/292; 30/294; 83/169; 83/745; 83/885; 83/886; 225/96
[58] Field of Search ................. 83/885, 883, 886, 440, 83/440.1, 169, 614, 654, 743, 745; 225/96, 96.5; 30/164.9, 164.95, 286, 287, 289, 290, 292, 294; 33/32 R, 32 C

[56] References Cited

U.S. PATENT DOCUMENTS

| | | | |
|---|---|---|---|
| 2,078,386 | 4/1937 | Kendis | 83/885 |
| 2,529,210 | 11/1950 | Butler | 83/883 |
| 3,644,994 | 2/1972 | Lind | 30/292 |
| 3,742,793 | 7/1973 | Gray et al. | 83/169 |
| 4,137,803 | 2/1979 | Goldinger | 83/881 |
| 4,385,540 | 5/1983 | Dieter | 83/886 |
| 4,558,622 | 12/1985 | Tausheck | 83/885 |

Primary Examiner—E. R. Kazenske
Assistant Examiner—Hien H. Phan
Attorney, Agent, or Firm—Townsend & Townsend

[57] ABSTRACT

There is provided a laminated glass cutter. The cutter includes a rectangular body frame and a pair of opposed cutting members associated therewith. In use the laminated glass cutter may cut a laminated sheet into two adjacent separate components upon a single pass of the body over the sheet.

11 Claims, 3 Drawing Sheets

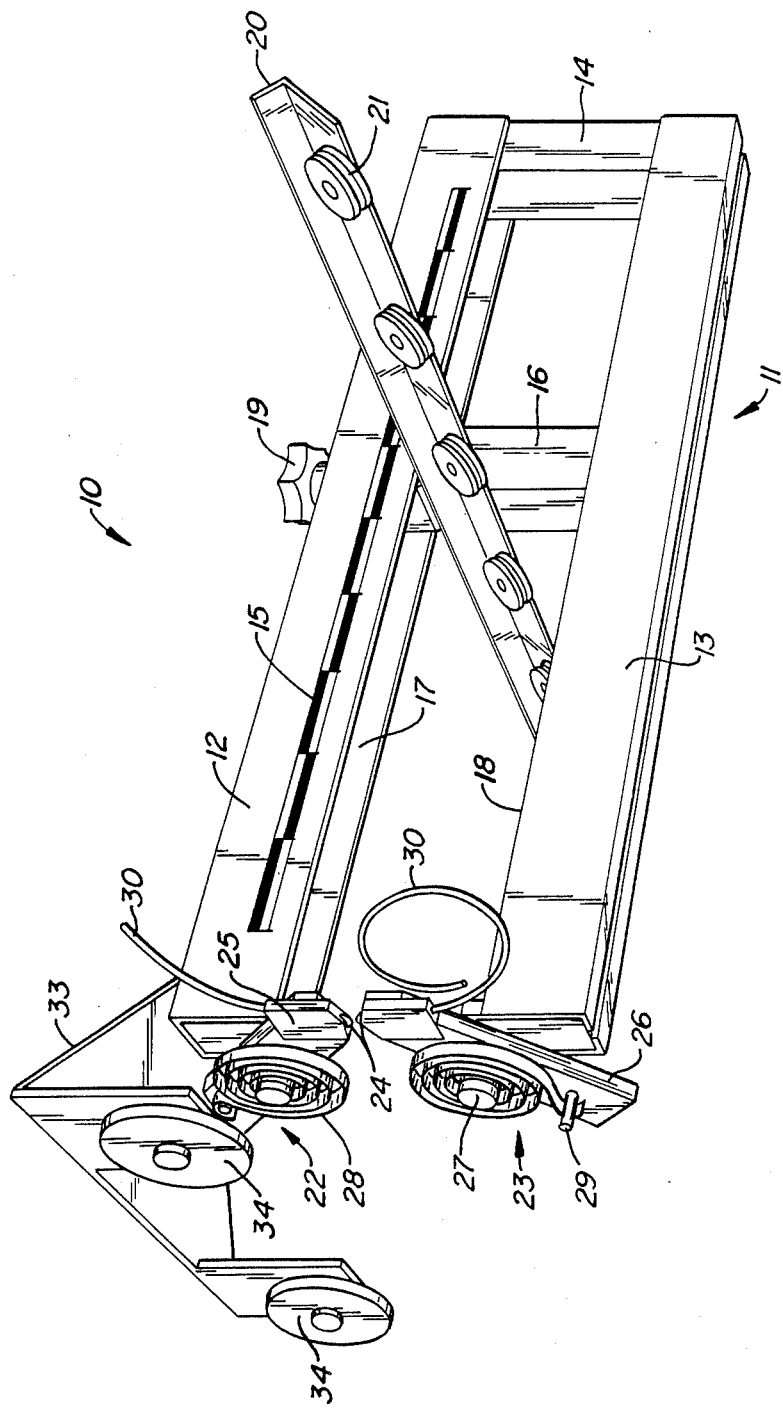
FIG.—1.

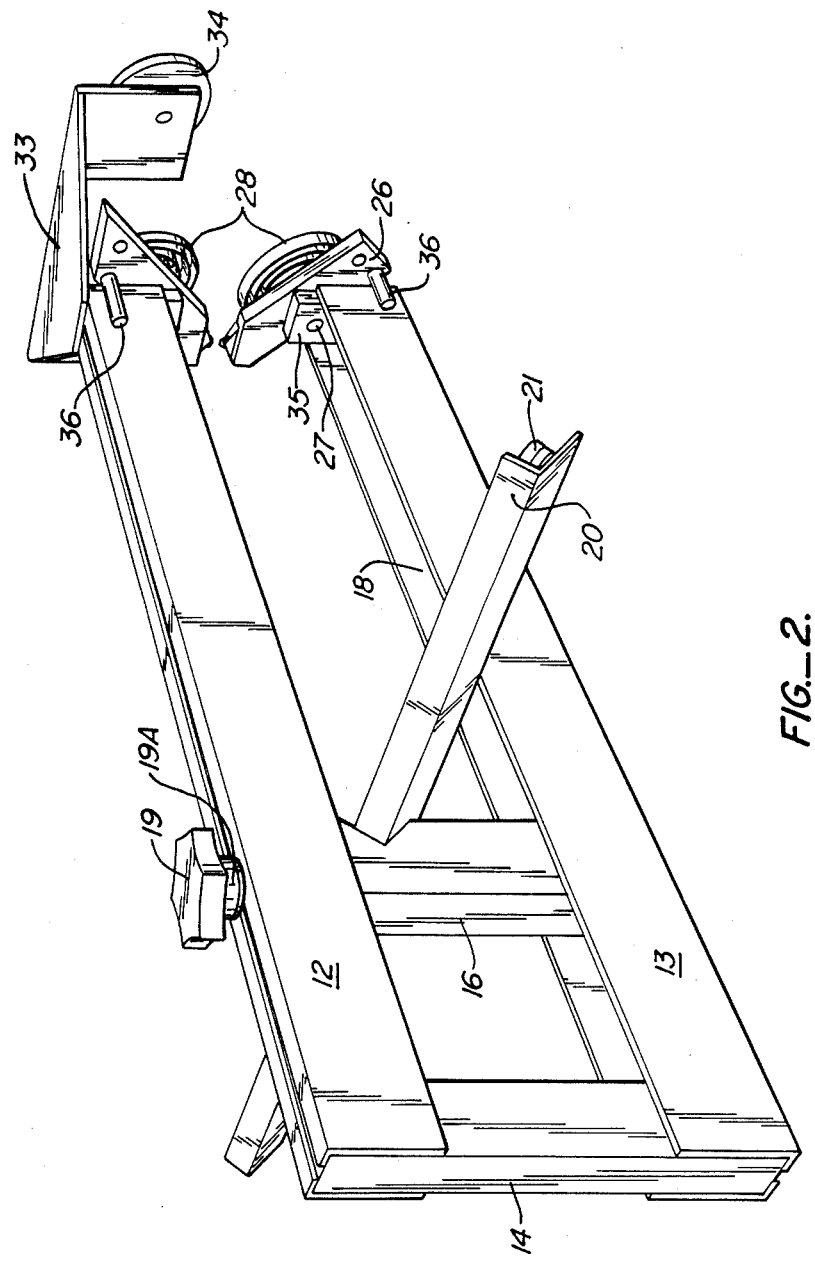
FIG._2.

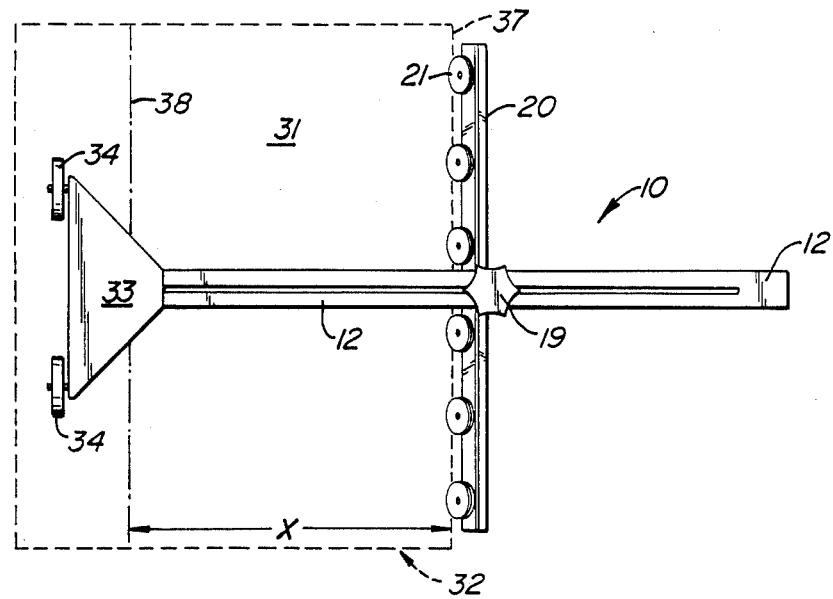
FIG._3.
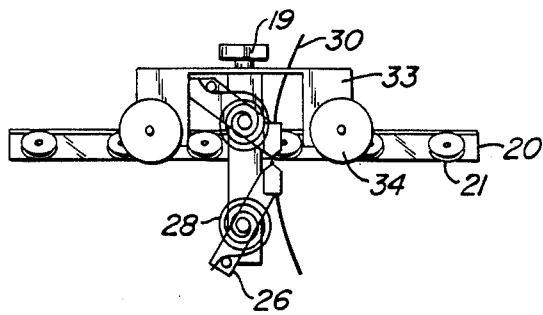
FIG._4.
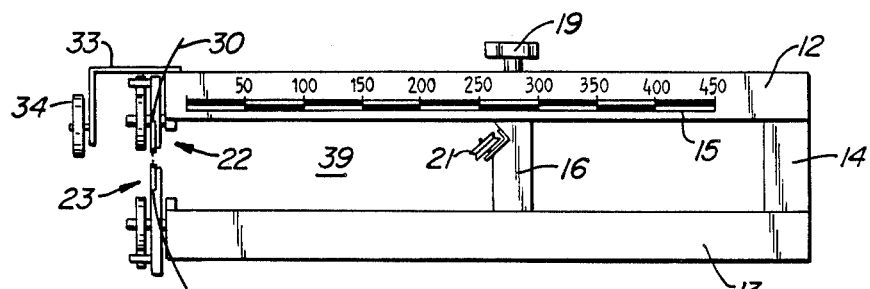
FIG._5.

LAMINATED GLASS CUTTER

This invention relates to a laminated glass cutter.

Hitherto conventional laminated glass cutters have comprised a manually operated implement having a cutting tip or blade for cutting one side of a laminated glass sheet and subsequently cutting the other side. Thus in regard to conventional laminated glass cutters an initial cut or score line was made to one side and then it was necessary to turn the laminated glass sheet over so that the other side was exposed so as to make a further cut or score line in the same region as the first cut so as to completely separate the cut components from each other. This process was time consuming and also had to be done by an experienced tradesman or skilled operator such as a professional glazier because of the skill necessary in making a clean cut between the cut components of the laminated glass sheet. Thus it was necessary to apply firm and even pressure to the laminated glass cutter during operation and in the hands of an inexperienced operator this may not be achieved giving a non-professional or inexpert finish or appearance to the cutting operation.

The manually operated implement in one form comprised a rod-like instrument having a shank which functioned as a handle and a cutting tip holder releasably secured to the shank. In another form there was provided a T shaped implement wherein the shank of the T at one free end had a cutting tip holder releasably secured thereto with the cross member of the T being supported by idler rollers so as to enable the instrument to travel freely over the glass surface. Both these conventional laminated glass cutters were relatively disadvantageous in use for the reasons referred to above.

The laminated glass cutter of the invention therefore includes a body; and a pair of opposed cutting members associated with the body whereby in use the laminated glass cutter may cut a laminated glass sheet into two adjacent and separate components upon a single pass of the body over the laminated glass sheet.

The body may be of any suitable type but preferably comprises a body frame which is suitably of rectangular configuration although this is not essential. In one preferred form of the invention the body frame includes a pair of opposed frame members and an end frame member with the opposed cutting members being located at an end of the body frame remote from the end frame member. Each pair of opposed frame members may be channel shaped in cross section.

Each opposed cutting member is preferably resiliently biassed inwardly or toward an adjacent major surface of the laminated glass sheet.

In one form of the abovementioned arrangement each cutting member may be pivotally mounted to the body frame by suitable pivot means which is spring loaded or biassed so as to make each cutting member make positive contact with an adjacent major surface of the laminated glass sheet.

Preferably each cutting member comprises a cutting tip and associated holder which is releasably attached to a support plate. The support plate associated with each cutting member may be pivotally mounted on a pivot spindle constituting one form of a suitable pivot means which is attached to a free end of an associated parallel frame member. There is also provided a coil spring mounted on the pivot spindle resiliently biassing each support plate in a direction toward an adjacent major surface of the laminated glass sheet in use.

There also may be provided means whereby the body may be movably supported on the laminated glass sheet in use. In one form there may be provided idler rollers or wheels which accomplish this particular purpose which are attached to the body frame.

In a more preferred form there may be provided a bracket attached to the body frame having attached thereto idler rollers which may be located adjacent to the pair of opposed cutting members. There also may be located a rail member also having a plurality of idler rollers located in opposed relationship to the bracket idler rollers. Suitably the idler rollers of the rail member are oriented so that they are all located in the common plane offset to the vertical so that they may travel on an edge portion of the laminated glass sheet in use.

There also may be provided means for determining the width of the laminated glass sheet to be cut and this may be effected in any suitable manner. In one form the aforesaid rail member may be attached to a travelling block or carriage member which may be adapted for movement in a forward (i.e. towards the pair of opposed cutter members) or reverse direction relative to the body frame. To this end the travelling block may be slidably movable relative to the parallel frame member of the body frame and be retained in a desired position thereto by suitable retaining means such as a grub screw or other suitable fastening member. In this particular embodiment the distance between the bracket rollers and the rail member rollers may correspond to the desired width of the glass sheet being cut and this may be indicated on a scale or indicator strip attached to one of the parallel frame member of the body.

It is also preferred in the abovementioned embodiment that each of the bracket wheels and rail members be located in a common plane so that they may travel on a top surface of the laminated glass cutter in use.

There also may be provided lubricating means associated with the pair of opposed cutting members so that as the laminated glass sheet is cut the cutting lines or cut edges formed in the laminated glass sheet by the opposed cutting members are lubricated. This enables the cutting operation to be carried out in an efficient manner and enables an even cut to be obtained.

In one form of lubricating means in the present invention there may be provided a tubular member of flexible material of relatively narrow bore which accommodates a reservoir of lubricating fluid which is associated with the cutting tip holder of each cutting member. There also may be provided a wick or filter in the tubular member to provide a controlled rate of flow of lubrication fluid therethrough.

Reference may now be made to a preferred embodiment of the invention as shown on the attached drawings wherein:

FIG. 1 is a perspective view of a laminated glass cutter constructed in accordance with the invention from one end;

FIG. 2 is a similar view of the laminated glass cutter shown in FIG. 1 from an opposite end;

FIG. 3 is a top plan view of the laminated glass cutter of FIG. 1 in operation cutting a laminated glass sheet;

FIG. 4 is an end view of the laminated glass cutter shown in FIG. 1; and

FIG. 5 is a side view of the laminated glass cutter shown in FIG. 1.

In the drawings there is shown laminated glass cutter 10 having body frame 11 comprising parallel frame members 12 and 13 and end frame member 14. There is also shown indicator strip or scale 15 as well as travelling block 16 slidably supported by frame members 12 and 13. Both frame members 12 and 13 are of square channel shape having opposed channels 17 and 18 which may accommodate the rectangular block 16 as shown. Also shown is adjusting knob 19 which engages with a screw threaded projection 19A which shown in phantom in FIG. 2 which extends outwardly from the body of block 16. When the knob 19 is unscrewed from the projection the block 16 may travel within frame 11 and when fastened the knob 19 may retain the block 16 in a desired location commensurate with a particular width of a glass sheet to be cut.

Attached to block 16 is a rail member 20 of angle shape as shown having attached thereto a plurality of idler rollers 21. These idler rollers are all located in a common plane and offset to the vertical as shown.

At one end of the body frame 11 are located a pair of opposed cutting members 22 and 23. Each cutting member 22 and 23 comprises a cutting tip 24, a holder 25, a support plate 26, a pivot spindle 27 and a coil spring 28 mounted on the spindle 27. Also shown is abutment 29 to which is engaged a free end of coil spring 28 as shown. There is also indicated lubrication hoses 30 for lubricating tips 24 when required. Each support plate 26 is spring loaded by an associated spring 28 so that each tip 24 is biassed towards each other so that positive contact is made with each opposed major suface 31 of a laminated glass sheet 32 interposed between cutting tips 24 in operation as shown in FIG. 3.

There is also shown bracket 33 attached or welded to top frame member 12 to which is mounted idler rollers 34 as shown. Also shown is support block 35 located in a respective channel 17 or 18 to which is attached a respective support plate 26 by spindle 27. Each support plate 26 is also provided with an abutment or stop 36 to retain each support plate in the position shown in FIGS. 1-2.

In operation as shown in FIG. 3 the adjusting knob of the laminated glass cutter 10 is adjusted so that the width "X" of the laminated glass sheet 32 is to be cut. Distance "X" corresponds with the distance between an edge 37 of sheet 32 and cutting line 38 which may easily be determined by scale 15 as shown in FIG. 3 by movement of block 16 and retention in the desired position by adjusting knob 19. Cutting line 38 corresponds to the location of cutting tips 24.

FIG. 4 illustrates how each support plate 26 is biassed towards each other so that positive contact is made with glass sheet 32 by each cutting tip 24. This is shown by the action of each coil spring 28. Lubrication fluid located in each hose 30 may be applied to cutting line 38 in a controlled manner by a wick (not shown) located in each hose 30.

In FIG. 5 the sheet 32 may be interposed between tips 24 as shown and hence the sheet may be accommodated in space 39 wherein edge 37 is contacted by idler rollers 21. Both idler rollers 21 and 34 are located in a common plane so that they may contact a common major surface 31 of sheet 32 as shown in FIG. 3.

It will also be appreciated that the pressure applied by tips 24 to each major surface 31 of sheet 32 which is effected by coil springs 28 may be selectively adjusted if required by tightening or loosening of spindles 27 or by substitution of different coil springs. The fixed rollers 34 assist in smooth travel of the apparatus 10 over the laminated glass sheet 32 as well as off the sheet 32.

The apparatus is suitably formed from aluminium and the sliding block 16 and idler rollers 21 and 34 from nylon. Due to the variable pressure applied by opposed tips 24 the laminated glass cutter 10 of the invention may be utilized for glass sheets of varying thicknesses such as between 2 mm and 12 mm. A suitable range of widths to be cut may be from 5 mm to 500 mm.

It will also be appreciated that no skill is required in use of the laminated glass cutter of the invention and may be marketed for use by either left handed or right handed operators by placement or turning of support plates 26 from one direction to another. In this context it will be appreciated that each support plate 26 is releasably mounted to body frame 11 by pivot spindles 27 which may comprise a shank, appropriate washers and a retaining nut. Also the laminated glass sheet 32 may be cut in one cutting operation on a single pass of the apparatus 10 over the laminated glass sheet 32.

I claim:

1. A laminated glass cutter comprising:
   a body frame;
   a pair of opposed cutting members associated with the body frame for imparting a scoreline to each adjacent major surface of a laminated glass sheet which in use is interposed between the pair of cutting members;
   lubrication means associated with each cutting member for application of lubricant to each scoreline;
   primary support means associated with the body frame for contacting the glass sheet adjacent one of the scorelines; and
   secondary support means spaced from the primary support means for contacting a side edge of the glass sheet, the secondary support means comprising an array of idler rollers movable relative to the body frame, the array of idler rollers being offset at an angle to the laminated glass sheet to facilitate contacting the side edge thereof during use;
   whereby in use an edge portion of the laminated glass sheet is cut in a single pass by imparting said scorelines to said opposed major surfaces, and wherein the width of said edge portion corresponds substantially to the spacing between the primary support means and the secondary support means.

2. A laminated glass cutter as claimed in claim 1 wherein each cutting member is resiliently biased toward an adjacent major surface of the laminated glass sheet in use.

3. A laminated glass cutter as claimed in claim 2 including first means for pivotally mounting each cutting member to the body frame, the pivot means being spring loaded so that in use each cutting member makes positive contact with said adjacent major surface.

4. A laminated glass cutter as claimed in claim 3 wherein each cutting member includes a support plate to which is releasably attached a cutting tip and associated tip holder.

5. A laminated glass cutter as claimed in claim 4 wherein each support plate is mounted to a pivot spindle extending outwardly from the body frame and said pivot spindle also has attached thereto a coil spring which is also attached to an abutment on the support plate.

6. A laminated glass cutter as claimed in claim 5 wherein the pivot spindle includes means for releasably attaching the support plate to the body.

7. A laminated glass cutter as claimed in claim 1 wherein the primary support means includes a set of idler rollers attached to an end of the body frame.

8. A laminated glass cutter as claimed in claim 1 wherein the movable set of idler rollers are associated with an adjustable block slidably mounted on the body which may be retained in a desired position.

9. A laminated glass cutter as claimed in claim 8 including means for determining the width of the laminated glass sheet to be cut and which corresponds to the setting of the adjustable block relative to the fixed set of idler rollers.

10. A laminated glass cutter as claimed in claim 9 wherein said width-determining means is an indicator strip or scale attached to the body.

11. A laminated glass cutter as claimed in claim 1 including means for selectively adjusting the pressure imparted to the laminated glass sheet in use by the pair of opposed cutting members.

* * * * *